United States Patent
Hilgendorff

(10) Patent No.: US 12,011,706 B2
(45) Date of Patent: Jun. 18, 2024

(54) AMMONIA OXIDATION CATALYST FOR DIESEL APPLICATIONS

(71) Applicant: BASF Corporation, Florham Park, NJ (US)

(72) Inventor: Marcus Hilgendorff, Hannover (DE)

(73) Assignee: BASF Corporation, Florham Park, NJ (US)

( * ) Notice: Subject to any disclaimer, the term of this patent is extended or adjusted under 35 U.S.C. 154(b) by 89 days.

(21) Appl. No.: 17/595,318

(22) PCT Filed: May 20, 2020

(86) PCT No.: PCT/EP2020/064115
§ 371 (c)(1),
(2) Date: Nov. 15, 2021

(87) PCT Pub. No.: WO2020/234375
PCT Pub. Date: Nov. 26, 2020

(65) Prior Publication Data
US 2022/0203338 A1 Jun. 30, 2022

(30) Foreign Application Priority Data
May 21, 2019 (EP) .................................... 19175634

(51) Int. Cl.
| | |
|---|---|
| *B01J 29/76* | (2006.01) |
| *B01D 53/94* | (2006.01) |
| *B01J 21/04* | (2006.01) |
| *B01J 23/46* | (2006.01) |
| *B01J 35/00* | (2006.01) |
| *B01J 35/56* | (2024.01) |
| *B01J 35/63* | (2024.01) |
| *B01J 37/00* | (2006.01) |
| *B01J 37/02* | (2006.01) |
| *B01J 37/04* | (2006.01) |
| *B01J 37/08* | (2006.01) |
| *F01N 3/20* | (2006.01) |
| *F01N 3/28* | (2006.01) |

(52) U.S. Cl.
CPC ........ *B01J 23/464* (2013.01); *B01D 53/9418* (2013.01); *B01D 53/9436* (2013.01); *B01J 21/04* (2013.01); *B01J 29/76* (2013.01); *B01J 35/19* (2024.01); *B01J 35/56* (2024.01); *B01J 35/63* (2024.01); *B01J 37/0009* (2013.01); *B01J 37/0036* (2013.01); *B01J 37/0213* (2013.01); *B01J 37/0246* (2013.01); *B01J 37/0248* (2013.01); *B01J 37/04* (2013.01); *B01J 37/082* (2013.01); *F01N 3/2066* (2013.01); *F01N 3/2803* (2013.01); *B01D 2255/1021* (2013.01); *B01D 2255/1025* (2013.01); *B01D 2255/20707* (2013.01); *B01D 2255/20715* (2013.01); *B01D 2255/2073* (2013.01); *B01D 2255/20761* (2013.01); *B01D 2255/2092* (2013.01); *B01D 2255/50* (2013.01); *B01D 2255/9155* (2013.01); *F01N 3/2839* (2013.01); *F01N 2330/06* (2013.01); *F01N 2370/04* (2013.01)

(58) Field of Classification Search
None
See application file for complete search history.

(56) References Cited

U.S. PATENT DOCUMENTS

| | | | |
|---|---|---|---|
| 2008/0292519 A1 | 11/2008 | Caudle et al. | |
| 2012/0122671 A1* | 5/2012 | Polli | B01J 37/0045 502/355 |
| 2013/0078160 A1 | 3/2013 | Yamashita et al. | |
| 2018/0056239 A1* | 3/2018 | Feaviour | F01N 3/103 |
| 2018/0280879 A1* | 10/2018 | Howells | B01D 53/9436 |
| 2019/0022584 A1 | 1/2019 | Hilgendorff et al. | |

FOREIGN PATENT DOCUMENTS

| | | |
|---|---|---|
| EP | 2 535 102 A1 | 12/2012 |
| EP | 2 878 360 A1 | 6/2015 |
| WO | WO 2010/062730 A3 | 6/2010 |
| WO | WO 2015/143191 A1 | 9/2015 |

OTHER PUBLICATIONS

International Search Report dated Jul. 9, 2020, PCT/EP2020/064115.
Sachi Shrestha et al., "Selective oxidation of ammonia on mixed and dual-layer Fe-ZSM-5 +pl/A1203 monolithic catalysts," Catalysts Today, vol. 231, Mar. 11, 2014, pp. 105-115.
Shrestha Sachi et al., "Selective oxidation of ammonia to nitrogen on bi-functional Cu-SSZ-13 and PU/A1203 monolith catalyst" Catalysts Today, vol. 267, Jan. 29, 2016, pp. 130-144.

* cited by examiner

*Primary Examiner* — Sheng H Davis
(74) *Attorney, Agent, or Firm* — DLA Piper LLP (US)

(57) ABSTRACT

The present invention relates to an ammonia oxidation catalyst for the treatment of an exhaust gas stream, the catalyst comprising a coating disposed on a substrate, wherein the coating comprises a selective catalytic reduction component being a zeolitic material comprising one or more of copper and iron; and an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania.

14 Claims, 1 Drawing Sheet

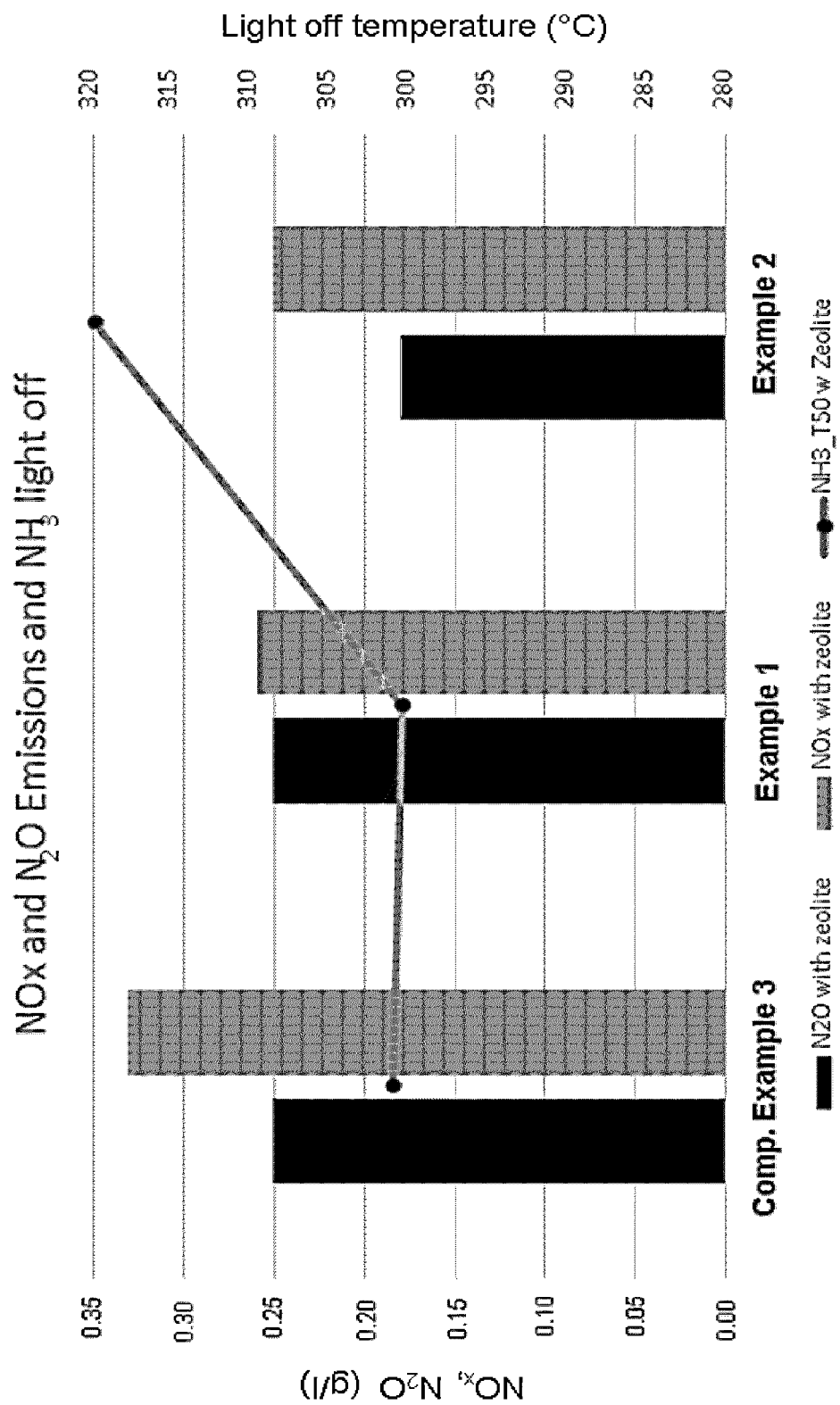

AMMONIA OXIDATION CATALYST FOR DIESEL APPLICATIONS

This application is a U.S. national stage entry application under 35 U.S.C. § 371 from International Application No. PCT/EP2020/064115, filed on May 20, 2020, which claims priority to E.P. Patent Application No. 19175634.5 filed on May 21, 2019; the contents of each application is incorporated herein by reference in its entirety.

The present invention relates to an ammonia oxidation catalyst for the treatment of an exhaust gas stream, a method for preparing an ammonia oxidation catalyst and a method for oxidizing ammonia using the catalyst of the present invention.

Many exhaust gas purifying system for diesel engines are, or will be, equipped with an active catalyst for the selective reduction of NOx by ammonia ($NH_3$). In general, ammonia ($NH_3$) is often generated from a urea solution that is injected into an exhaust gas of an exhaust gas treatment system. Under certain conditions, if more ammonia is injected than is consumed for the reduction of NOx, ammonia can be released from the exhaust system into the environment. However, ammonia is a toxic gas. There is thus a need to prevent such ammonia release. Therefore, at the outlet of an exhaust gas system, an ammonia oxidation (AMOX) catalyst can be placed to oxidize the ammonia, preferably to harmless nitrogen. WO 2010/062730 A2 discloses layered or zoned AMOX catalysts comprising Cu—CHA and platinum on alumina. EP 2 878 360 A1 discloses an exhaust gas purifying catalyst comprises a lower catalyst layer comprising a NOx reduction catalyst, a front upper layer, disposed on the lower layer, comprising a NOx reduction catalyst and a rear upper layer, disposed on the lower layer, comprising an oxidation catalyst. Further, it is known that ammonia oxidation catalysts oxidize ammonia to NOx at temperatures above 400° C. depending on the concentrations and flow rates. This however leads to extra NOx emissions that need to be avoided. Thus, there was still a need to provide ammonia oxidation catalysts which have reduced NOx formation at high temperatures for internal combustion engines, preferably for diesel engines.

Therefore, it was an object of the present invention to provide improved ammonia oxidation catalysts which permit to reduce the NOx formation at high temperatures as well as the formation of nitrous oxide ($N_2O$). Surprisingly, it was found that the ammonia oxidation catalyst for the treatment of an exhaust gas stream according to the present invention permits to reduce the NOx formation at high temperatures as well as the formation of nitrous oxide ($N_2O$).

Therefore, the present invention relates to an ammonia oxidation catalyst for the treatment of an exhaust gas stream, the catalyst comprising a coating disposed on a substrate, wherein the coating comprises (i) a selective catalytic reduction component being a zeolitic material comprising one or more of copper and iron; and (ii) an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania.

In the context of the present invention, it is preferred that the exhaust gas stream is an exhaust gas stream exiting a diesel engine.

It is preferred that the selective catalytic reduction component according to (i) is a 8-membered ring pore zeolitic material. It is more preferred that the 8-membered ring pore zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA, AEI, a mixture of two thereof and a mixed type of two thereof, more preferably selected from the group consisting of CHA and AEI. It is more preferred that the 8-membered ring pore zeolitic material has a framework type CHA. It is more preferred that the 8-membered ring pore zeolitic material is a zeolite SSZ-13.

It is preferred that the zeolitic material has a framework structure, wherein from 95 to 100 weight-%, more preferably from 98 to 100 weight-%, more preferably from 99 to 100 weight-%, of the framework structure of the zeolitic material consist of Si, Al, O, and optionally H, wherein in the framework structure, the molar ratio of Si to Al, calculated as molar $SiO_2:Al_2O_3$, more preferably is in the range of from 2:1 to 50:1, more preferably in the range of from 5:1 to 40:1, more preferably in the range of from 8:1 to 30:1, more preferably in the range of from 9:1 to 24:1, more preferably in the range of from 10:1 to 22:1.

It is preferred that the zeolitic material comprises copper, wherein the amount of copper in the zeolitic material, calculated as CuO, is in the range of from 0.1 to 10 weight-%, more preferably in the range of from 2 to 8 weight-%, more preferably in the range of from 3 to 7 weight-%, more preferably in the range of from 4 to 6.5 weight-%, based on the total weight of the zeolitic material. It is more preferred that the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material. In the context of the present invention, it is thus to be understood that it is more preferred that the zeolitic material is substantially free of, more preferably free of, iron. Alternatively, it is preferred that the zeolitic material comprises iron, wherein the amount of iron comprised in the zeolitic material, calculated as $Fe_2O_3$, more preferably is in the range of from 0.1 to 10 weight-%, more preferably in the range of from 0.5 to 7 weight-%, more preferably in the range of from 1 to 5.5 weight-%, more preferably in the range of from 2 to 5.5 weight-%, based on the total weight of the zeolitic material.

It is preferred that the coating comprises the selective catalytic component (i) at a loading in the range of from 1 to 5 $g/in^3$, preferably in the range of from 1.2 to 4 $g/in^3$, more preferably in the range of from 1.5 to 3.5 $g/in^3$.

It is preferred that from 60 to 95 weight-%, more preferably from 70 to 92 weight-%, more preferably from 75 to 90 weight-%, of the coating consists of the selective catalytic component (i).

Therefore, the present invention preferably relates to an ammonia oxidation catalyst for the treatment of an exhaust gas stream, the catalyst comprising a coating disposed on a substrate, wherein the coating comprises (i) a selective catalytic reduction component being a 8-membered ring pore zeolitic material comprising one or more of copper and iron, more preferably copper; wherein in the framework structure of the zeolitic material, the molar ratio of Si to Al, calculated as molar $SiO_2:Al_2O_3$, more preferably is in the range of from 2:1 to 50:1, more preferably in the range of from 5:1 to 40:1, more preferably in the range of from 8:1 to 30:1, more preferably in the range of from 9:1 to 24:1, more preferably in the range of from 10:1 to 22:1; and (ii) an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania.

In the context of the present invention, it is preferred that the coating further comprises an oxidic binder. The oxidic binder preferably comprises one or more of zirconia, alumina, titania, silica, and a mixed oxide comprising two or more of Zr, Al, Ti and Si. It is more preferred that the oxidic binder comprises one or more of zirconia and alumina, more preferably zirconia.

As to the oxidic binder, it is preferred that the coating comprises the oxidic binder at an amount in the range of from 1 to 10 weight-%, more preferably in the range of from 2 to 8 weight-%, more preferably in the range of from 3 to 6 weight-%, based on the weight of the zeolitic material.

It is preferred that from 65 to 95 weight-%, more preferably from 70 to 92 weight-%, more preferably from 75 to 90 weight-%, of the oxidation catalytic component consist of the porous non-zeolitic oxidic support.

It is preferred that the porous non-zeolitic oxidic support comprises one or more of alumina, silica, zirconia, zirconia-alumina, silica-alumina, and mixture of two or more thereof, more preferably one or more of alumina, zirconia-alumina, silica-alumina, and mixture of two or more thereof. It is more preferred that the porous non-zeolitic oxidic support comprises alumina.

It is preferred that from 95 to 100 weight-%, more preferably from 98 to 100 weight-%, more preferably from 99 to 100 weight-%, more preferably from 99.5 to 100 weight-%, of the porous non-zeolitic oxidic support consist of alumina.

It is preferred that the coating comprises the porous non-zeolitic oxidic support at a loading in the range from 0.15 to 1.0 $g/in^3$, more preferably in the range of from 0.15 to 0.75 $g/in^3$, more preferably in the range of from 0.20 to 0.50 $g/in^3$.

It is preferred that the coating comprises the selective catalytic reduction component (i) at a loading I1, (I1), and the porous non-zeolitic oxidic support at a loading I3, (I3), wherein the loading ratio of the selective catalytic reduction component (i) relative to the porous non-zeolitic oxidic support, expressed as (I1):(I3), is in the range of from 1:1 to 25:1, more preferably in the range of from 2:1 to 20:1, more preferably in the range of from 3:1 to 15:1, more preferably in the range of from 4:1 to 12:1, more preferably in the range of from 5:1 to 10:1.

Therefore, the present invention preferably relates to an ammonia oxidation catalyst for the treatment of an exhaust gas stream, the catalyst comprising a coating disposed on a substrate, wherein the coating comprises (i) a selective catalytic reduction component being a 8-membered ring pore zeolitic material comprising one or more of copper and iron, more preferably copper; and (ii) an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania; wherein the porous non-zeolitic oxidic support comprises alumina;

wherein the coating comprises the selective catalytic reduction component (i) at a loading I1, (I1), and the porous non-zeolitic oxidic support at a loading I3, (I3), wherein the loading ratio of the selective catalytic reduction component (i) relative to the porous non-zeolitic oxidic support, expressed as (I1):(I3), is in the range of from 1:1 to 25:1, more preferably in the range of from 2:1 to 20:1, more preferably in the range of from 3:1 to 15:1, more preferably in the range of from 4:1 to 12:1, more preferably in the range of from 5:1 to 10:1.

In the context of the present invention, it is preferred that the platinum supported on the porous non-zeolitic oxidic support has an average crystallite size which is lower than 5 nm, preferably in the range of from 0.001 to 3 nm, the average crystallite size being determined according to Reference Example 10.

It is preferred that the platinum supported on the porous non-zeolitic oxidic support of the catalyst, when said catalyst has been aged in a gas atmosphere at a temperature in the range of from 700 to 800° C. for a duration in the range of from 10 to 20 h, wherein the gas atmosphere preferably comprises 5 to 15% steam, has an average crystallite size in the range of from 5 to 100 nm, preferably in the range of from 10 to 30 nm, more preferably in the range of from 12 to 28 nm, more preferably in the range of from 14 to 25 nm, the average crystallite size being determined according to Reference Example 10. It is preferred that the ageing be at a temperature in the range of from 720 to 780° C., more preferably in the range of from 740 to 760° C., more preferably at 750° C., for a duration in the range of from 14 to 18 hours, more preferably in the range of from 15 to 17 hours, more preferably for a duration of 16 hours, wherein the gas atmosphere preferably comprises 8 to 12% steam, more preferably 10% steam.

It is preferred that the coating comprises platinum, calculated as elemental platinum, at an amount in the range of from 0.2 to 1.5 weight-%, more preferably in the range of from 0.5 to 1.0 weight-%, based on the weight of the porous non-zeolitic oxidic support.

It is preferred that the coating has a platinum loading in the catalyst, calculated as elemental platinum, in the range of from 0.5 to 25 $g/ft^3$, more preferably in the range of from 0.75 to 15 $g/ft^3$, more preferably in the range of from 1 to 8 $g/ft^3$, more preferably in the range of from 1.5 to 5 $g/ft^3$.

It is preferred that the oxidation catalytic component further comprises one or more platinum group metals other than platinum, preferably one or more of palladium and rhodium, more preferably rhodium. Thus, it is preferred that the oxidation component comprises platinum and rhodium.

It is preferred that the coating comprises the one or more platinum group metals other than platinum, calculated as elemental platinum group metal, at an amount in the range of from 0.1 to 1.5 weight-%, more preferably in the range of from 0.2 to 0.9 weight-%, more preferably in the range of from 0.3 to 0.7 weight-%, based on the weight of the porous non-zeolitic oxidic support.

It is preferred that the coating comprises the one or more platinum group metals other than platinum at a loading in the catalyst, calculated as elemental platinum group metal, in the range of from 0.5 to 20 $g/ft^3$, preferably in the range of from 0.75 to 12 $g/ft^3$, more preferably in the range of from 1 to 6 $g/ft^3$, more preferably in the range of from 1.5 to 4 $g/ft^3$.

Therefore, the present invention preferably relates to an ammonia oxidation catalyst for the treatment of an exhaust gas stream, the catalyst comprising a coating disposed on a substrate, wherein the coating comprises (i) a selective catalytic reduction component being a 8-membered ring pore zeolitic material comprising one or more of copper and iron, more preferably copper; and (ii) an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania; wherein the porous non-zeolitic oxidic support comprises alumina;

wherein the coating comprises the selective catalytic reduction component (i) at a loading I1, (I1), and the porous non-zeolitic oxidic support at a loading I3, (I3), wherein the loading ratio of the selective catalytic reduction component (i) relative to the porous non-zeolitic oxidic support, expressed as (I1):(I3), is in the range of from 1:1 to 25:1, more preferably in the range of from 2:1 to 20:1, more preferably in the range of from 3:1 to 15:1, more preferably in the range of from 4:1 to 12:1, more preferably in the range of from 5:1 to 10:1;

wherein the coating comprises platinum, calculated as elemental platinum, at an amount in the range of from 0.2 to 1.5 weight-%, more preferably in the range of from 0.5 to 1.0 weight-%, based on the weight of the porous non-zeolitic oxidic support;

wherein the oxidation catalytic component further comprises one or more platinum group metals other than platinum, preferably one or more of palladium and rhodium, more preferably rhodium; wherein the coating more preferably comprises the one or more platinum group metals other than platinum, calculated as elemental platinum group metal, at an amount in the range of from 0.1 to 1.5 weight-%, more preferably in the range of from 0.2 to 0.9 weight-%, more preferably in the range of from 0.3 to 0.7 weight-%, based on the weight of the porous non-zeolitic oxidic support.

In the context of the present invention, it is preferred that the coating has a total platinum group metal loading in the catalyst, calculated as elemental platinum group metal, in the range of from 1 to 45 g/ft$^3$, more preferably in the range of from 1.5 to 27 g/ft$^3$, more preferably in the range of from 2 to 14 g/ft$^3$, more preferably in the range of from 3 to 9 g/ft$^3$. It is more preferred that the coating has a platinum+ rhodium loading in the catalyst, calculated as elemental Pt and elemental Rh, in the range of from 1 to 45 g/ft$^3$, more preferably in the range of from 1.5 to 27 g/ft$^3$, more preferably in the range of from 2 to 14 g/ft$^3$, more preferably in the range of from 3 to 9 g/ft$^3$.

It is preferred that the coating has a platinum loading I(a), calculated as elemental platinum, and a one or more platinum group metals other than platinum loading I(b), calculated as elemental platinum group metal, wherein the loading ratio of platinum relative to the one or more platinum group metals other than platinum, expressed as I(a):I(b), is in the range of from 1:10 to 10:1, more preferably in the range of from 1:5 to 8:1, more preferably in the range of from 1:2 to 7:1, more preferably in the range of from 1:1 to 6:1, more preferably in the range of from 1.1:1 to 5:1, more preferably in the range of from 1.2:1 to 3:1.

It is preferred that from 95 to 100 weight-%, more preferably from 98 to 100 weight-%, more preferably from 99 to 100 weight-%, more preferably from 99.5 to 100 weight-%, of the first oxidic material consist of titania.

It is preferred that the coating comprises the first oxidic material at an amount in the range of from 1 to 20 weight-%, more preferably in the range of from 2 to 10 weight-%, more preferably in the range of from 2.5 to 7.5 weight-%, more preferably in the range of from 3 to 6 weight-%, based on the weight of the porous non-zeolitic oxidic support.

It is preferred that from 0 to 0.1 weight-%, preferably from 0 to 0.01 weight-%, more preferably from 0 to 0.001 weight-%, more preferably from 0.0001 weight-%, of the coating consist of cerium. In the context of the present invention, it is thus to be understood that it is preferred that the coating is substantially free of, more preferably free of, cerium. It is more preferred that the catalyst is substantially free of, more preferably free of, cerium.

According to a first aspect of the present invention, it is preferred that from 95 to 100 weight-%, more preferably from 98 to 100 weight-%, more preferably from 99 to 100 weight-%, more preferably from 99.5 to 100 weight-%, of the coating consist of the oxidation catalytic component (ii), which comprises platinum, the porous non-zeolitic oxidic support, and the first oxidic material comprising titania, wherein the oxidation catalytic component more preferably further comprises one or more platinum group metals other than platinum, the selective catalytic reduction component (i), and more preferably an oxidic binder as defined in the foregoing.

In the context of the present invention, it is preferred that the oxidation catalytic component further comprises a second oxidic material supported on the porous non-zeolitic oxidic support, the second oxidic material comprising one or more of manganese, cerium, tungsten, molybdenum, praseodymium, europium, chromium, cobalt, technetium, rhenium, ruthenium, vanadium and indium, more preferably comprising one or more of manganese, cerium, tungsten, praseodymium and indium, more preferably one or more of manganese, cerium and praseodymium, more preferably one or more of manganese and cerium. It is more preferred that the second oxidic material comprises manganese, more preferably manganese oxide, more preferably one or more of MnO, $Mn_2O_3$, $Mn_3O_4$ and $MnO_2$.

It is preferred that from 95 to 100 weight-%, more preferably from 98 to 100 weight-%, more preferably from 99 to 100 weight-%, more preferably 99.5 to 100 weight-%, of the second oxidic material consist of manganese and oxygen.

It is preferred that the coating comprises the second oxidic material at an amount in the range of from 1 to 20 weight-%, more preferably in the range of from 2 to 10 weight-%, based on the weight of the porous non-zeolitic oxidic support.

According to a second aspect of the present invention, it is preferred that from 95 to 100 weight-%, more preferably from 98 to 100 weight-%, more preferably from 99 to 100 weight-%, more preferably from 99.5 to 100 weight-%, of the coating consist of the oxidation catalytic component (ii), which comprises platinum, the porous non-zeolitic oxidic support, the first oxidic material comprising titania, and the second oxidic material, wherein the oxidation catalytic component more preferably further comprises one or more platinum group metals other than platinum, the selective catalytic reduction component (i), and more preferably an oxidic binder as defined in the foregoing.

In the context of the present invention, it is preferred that the substrate is a flow-through substrate or a wall flow filter substrate, more preferably a flow-through substrate.

It is preferred that the substrate comprises, more preferably consists of, one or more of a cordierite, an aluminum titanate, a mullite and a silicon carbide, more preferably one or more of a cordierite, an aluminum titanate and a silicon carbide, more preferably a cordierite. It is more preferred that the substrate is a cordierite flow-through substrate. Alternatively, it is preferred that the substrate comprises, more preferably consist of, a metallic substance, wherein the metallic substance more preferably comprises, more preferably consists of, oxygen and one or more of iron, chromium and aluminum. It is more preferred that the substrate is a metallic flow-through substrate.

In the context of the present invention, it is preferred that the substrate has an inlet end, an outlet end, a substrate axial length extending from the inlet end to the outlet end and a plurality of passages defined by internal walls of the substrate extending therethrough, wherein the interface between the passages and the internal walls is defined by the surface of the internal walls. It is more preferred that the coating is disposed on the surface of the internal walls of the substrate and extends over 95 to 100%, more preferably over 98 to 100%, more preferably over 99 to 100%, of the substrate axial length. It is more preferred that the coating extends from the inlet end to the outlet end of the substrate.

It is preferred that the catalyst comprises the coating at a loading in the range of from 1 to 6 g/in$^3$, more preferably in the range of from 1.5 to 4.5 g/in$^3$, more preferably in the range of from 1.75 to 3.75 g/in$^3$.

It is preferred that the catalyst consists of the substrate and the coating.

The present invention further relates to an aged catalyst, obtainable or obtained by a method comprising, preferably consisting of, subjecting the catalyst according to the present invention to an ageing treatment comprising, preferably consisting of (i) heating the catalyst in a gas atmosphere at a temperature in the range of from 700 to 800° C. for a duration in the range of from 10 to 20 h, the gas atmosphere preferably comprising 5 to 15% steam;

said aged catalyst comprises the platinum supported on the porous non-zeolitic oxidic support which exhibits an average crystallite size in the range of from 5 to 100 nm, preferably in the range of from 10 to 30 nm, more preferably in the range of from 12 to 28 nm, more preferably in the range of from 14 to 25 nm, the average crystallite size being determined according to Reference Example 10. It is more preferred that the ageing treatment consists of heating the catalyst according to the present invention at a temperature of 750° C. for 16 hours with 10% steam.

The present invention further relates to a process for preparing the ammonia oxidation catalyst according to the present invention, the process comprising (a) preparing a first mixture comprising water and the selective catalytic reduction component being the zeolitic material comprising one or more of copper and iron, and preferably a precursor of an oxidic binder, more preferably the oxidic binder as defined in the foregoing;
(b) preparing a second mixture comprising water and a source of the oxidation catalytic component comprising a source of platinum, the porous non-zeolitic oxidic support and the first oxidic material comprising titania;
(c) mixing the first mixture obtained in (a) and the second mixture obtained in (b);
(d) disposing the mixture obtained in (c) on a substrate; and optionally drying the substrate comprising the mixture disposed thereon;
(e) calcining the substrate obtained in (d).

As to (a), it is preferred that it further comprises
(a.1) preparing a mixture comprising water and a precursor of an oxidic binder, wherein the precursor more preferably is one or more of an aluminum salt, a silicon salt, a zirconium salt, and a titanium salt, more preferably one or more of a zirconium salt, and an aluminum salt, more preferably a zirconium salt, more preferably zirconium acetate;
(a.2) adding the selective catalytic reduction component being the zeolitic material comprising one or more of copper and iron, more preferably being a 8-membered ring pore zeolitic material comprising copper, to the mixture obtained in (a.1).

As to (b), it is preferred that it further comprises
(b.1) impregnating the source of platinum onto the porous non-zeolitic oxidic support with an adjuvant, the adjuvant preferably being one or more of water and an alcohol, more preferably water;
(b.2) preferably impregnating a source of one or more platinum group metals other than platinum onto the impregnated porous non-zeolitic oxidic support obtained in (b.1);
(b.3) impregnating a solution comprising a source of the first oxidic material comprising titania, preferably impregnating a titania hydrogel, onto the impregnated porous non-zeolitic oxidic support obtained in (b.1), preferably obtained in (b.2), obtaining a mixture;
(b.4) optionally adding a source of a second oxidic material to the mixture obtained in (b.3);
(b.5) drying and/or calcining the mixture obtained in (b.3), optionally the mixture obtained in (b.4), obtaining a powder;
(b.6) preparing a mixture comprising water and the powder obtained in (b.5);
(b.7) preferably milling the particles of the mixture obtained in (b.6), more preferably until the particles of the mixture have a Dv90 in the range of from 3 to 30 micrometers, more preferably in the range of from 5 to 20 micrometers, more preferably in the range of from 8 to 18 micrometers, the Dv90 being determined as described in Reference Example 1.

It is more preferred that (b) consists of (b.1), (b.2), (b.3), (b.5), (b.6) and more preferably (b.7). Alternatively, it is more preferred that (b) consists of (b.1), (b.2), (b.3), (b.4), (b.5), (b.6) and more preferably (b.7).

It is preferred that impregnating according to (b.3) is performed by adding under stirring the solution comprising a source of the first oxidic material to the impregnated porous non-zeolitic oxidic support obtained in (b.1), more preferably in (b.2).

It is preferred that (b.4) is performed by adding under stirring the source of a second oxidic material to the mixture obtained in (b.3).

It is preferred that the source of a second oxidic material provided in (b.4) is a source comprising one or more of manganese, cerium, tungsten, molybdenum, praseodymium, europium, chromium, cobalt, technetium, rhenium, ruthenium, vanadium and indium, more preferably comprising one or more of manganese, cerium, tungsten, praseodymium and indium, more preferably one or more of manganese, cerium and praseodymium, more preferably one or more of manganese and cerium, more preferably a source comprising manganese.

It is preferred that the source of a second oxidic material provided in (b.4) is a salt, more preferably a nitrate, more preferably a manganese nitrate.

As to (b), it is alternatively preferred that it further comprises
- (b.1') impregnating the source of platinum onto the porous non-zeolitic oxidic support with an adjuvant, the adjuvant more preferably being one or more of water and an alcohol, more preferably water;
- (b.2') impregnating a solution comprising a source of the first oxidic material comprising titania, more preferably a titania hydrogel, onto the impregnated porous non-zeolitic oxidic support obtained in (b.1), obtaining a mixture;
- (b.3') impregnating a source of one or more platinum group metals other than platinum onto the impregnated porous non-zeolitic oxidic support obtained in (b.2');
- (b.4') drying and/or calcining the mixture obtained in (b.3'), obtaining a powder;
- (b.5') preparing a mixture comprising water and the powder obtained in (b.4');
- (b.6') preferably milling the particles of the mixture obtained in (b.5'), more preferably until the particles of the mixture have a Dv90 in the range of from 3 to 30 micrometers, more preferably in the range of from 5 to 20 micrometers, more preferably in the range of from 8 to 18 micrometers, the Dv90 being determined as described in Reference Example 1.

It is more preferred that (b) consists of (b.1'), (b.2'), (b.3'), (b.4'), (b.5') and more preferably (b.6').

It is preferred that impregnating according to (b.2') is performed by adding under stirring the solution comprising a source of the first oxidic material to the impregnated porous non-zeolitic oxidic support obtained in (b.1').

It is preferred that the source of one or more platinum group metals other than platinum provided in (b.2), or (b.3'), is one or more of a source of rhodium and a source of palladium, more preferably one or more of a rhodium nitrate solution and a palladium nitrate solution, more preferably a rhodium nitrate solution.

It is preferred that drying according to (b.5), or (b.4'), is performed in a gas atmosphere having a temperature in the range of from 90 to 160° C., more preferably in the range of from 110 to 130° C., the gas atmosphere more preferably comprising oxygen.

It is preferred that calcining according to (b.5), or (b.4'), is performed in a gas atmosphere having a temperature in the range of from 300 to 800° C., more preferably in the range of from 400 to 700° C., the gas atmosphere more preferably comprising oxygen.

It is preferred that the porous non-zeolitic oxidic support provided in (b) comprises pores having an average pore size in the range of from 8 to 45 nm, more preferably in the range of from 10 to 40 nm, more preferably in the range of from 12 to 30 nm, more preferably in the range of from 15 to 25 nm, the average pore size being determined according to Reference Example 2.

It is more preferred that the porous non-zeolitic oxidic support provided in (b) has an average pore volume in the range of from 0.6 ml/cm$^3$ to 2 ml/cm$^3$, more preferably in the range of from 0.65 ml/cm$^3$ to 1.75 ml/cm$^3$, more preferably in the range of from 0.70 ml/cm$^3$ to 1.5 ml/cm$^3$, the average pore volume being determined according to Reference Example 2.

It is preferred that the porous non-zeolitic oxidic support provided in (b) has a BET specific surface area in the range of from 40 to 300 m$^2$/g, more preferably in the range of from 50 to 200 m$^2$/g, more preferably in the range of from 70 to 160 m$^2$/g, the BET specific surface area being determined according to Reference Example 3.

It is preferred that from 95 to 100 weight-%, more preferably from 98 to 100 weight-%, more preferably from 99 to 100 weight-%, more preferably from 99.5 to 100 weight-%, of the porous non-zeolitic oxidic support consist of alumina.

It is preferred that disposing the mixture obtained in (c) according to (d) is performed by spraying the mixture onto the substrate or by immersing the substrate into the mixture, preferably by immersing the substrate into the mixture.

It is preferred that the substrate provided in (d) has an inlet end, an outlet end, a substrate axial length extending from the inlet end to the outlet end and a plurality of passages defined by internal walls of the substrate extending therethrough, wherein the interface between the passages and the internal walls defines the surface of the internal walls.

It is preferred that the mixture obtained in (c) is disposed according to (d) over 95 to 100%, more preferably from 98 to 100%, more preferably from 99 to 100%, of the substrate axial length, preferably from the inlet end to the outlet end.

It is preferred that the substrate provided in (d) is a flow-through substrate or a wall flow filter substrate, more preferably a flow-through substrate. It is preferred that the substrate provided in (d) is a ceramic substrate, wherein the substrate more preferably comprises, more preferably consists of, one or more of a cordierite, an aluminum titanate, a mullite and a silicon carbide, more preferably one or more of a cordierite, an aluminum titanate and a silicon carbide, more preferably a cordierite. It is preferred that the substrate is a cordierite flow-through substrate. Alternatively, it is preferred that the substrate provided in (d) comprises, more preferably consist of, a metallic substance, wherein the metallic substance more preferably comprises, more preferably consists of, oxygen and one or more of iron, chromium and aluminum. It is more preferred that the substrate is a metallic flow-through substrate.

It is preferred that drying according to (d) is performed in a gas atmosphere having a temperature in the range of from 90 to 180° C., more preferably in the range of from 110 to 130° C., the gas atmosphere more preferably comprising oxygen.

It is preferred that drying according to (d) is performed in a gas atmosphere for a duration in the range of from 10 to 300 minutes, more preferably in the range of from 60 to 120 minutes, the gas atmosphere more preferably comprising oxygen.

It is preferred that calcining according to (e) is performed in a gas atmosphere having a temperature in the range of from 300 to 800° C., more preferably in the range of from 450 to 650° C., the gas atmosphere more preferably comprising oxygen.

It is preferred that calcining according to (e) is performed in a gas atmosphere for a duration in the range of from 10 to 300 minutes, more preferably in the range of from 60 to 120 minutes, the gas atmosphere more preferably comprising oxygen.

It is preferred that the process further comprises
- (f) ageing the product obtained in (e) in a gas atmosphere, more preferably having a temperature in the range of from 600 to 900° C., more preferably in the range of from 700 to 800° C., the gas atmosphere more preferably comprising oxygen.

It is preferred that the ageing according to (f) is performed for a duration in the range of from 3 to 40 hours, more preferably in the range of from 5 to 25 hours, more preferably in the range of from 10 to 20 hours.

It is preferred that the platinum supported on the porous non-zeolitic oxidic support in the ammonia oxidation catalyst obtained in (f) has an average crystallite size in the range of from 5 to 100 nm, preferably in the range of from 10 to 30 nm, more preferably in the range of from 12 to 28 nm, more preferably in the range of from 14 to 25 nm, the average crystallite size being determined according to Reference Example 10.

It is preferred that the process consists of (a), (b), (c), (d), (e) and optionally (f).

The present invention further relates to an ammonia oxidation catalyst obtained or obtainable by a process according to the present invention.

The present invention further relates to a use of an ammonia oxidation catalyst according to the present invention for the oxidation of ammonia, wherein ammonia is preferably comprised in an exhaust gas stream from a diesel engine.

The present invention further relates to a method for oxidizing ammonia, wherein ammonia is comprised in an exhaust gas stream, the method comprising
  (1) providing the exhaust gas stream, preferably from a diesel engine;
  (2) passing the exhaust gas stream provided in (1) through a catalyst according to the present invention.

The present invention is further illustrated by the following set of embodiments and combinations of embodiments resulting from the dependencies and back-references as indicated. In particular, it is noted that in each instance where a range of embodiments is mentioned, for example in the context of a term such as "The ammonia oxidation catalyst of any one of embodiments 1 to 3", every embodiment in this range is meant to be explicitly disclosed for the skilled person, i.e. the wording of this term is to be understood by the skilled person as being synonymous to "The ammonia oxidation catalyst of any one of embodiments 1, 2 and 3". Further, it is explicitly noted that the following set of embodiments is not the set of claims determining the extent of protection, but represents a suitably structured part of the description directed to general and preferred aspects of the present invention.

1. An ammonia oxidation catalyst for the treatment of an exhaust gas stream, the catalyst comprising a coating disposed on a substrate, wherein the coating comprises
  (i) a selective catalytic reduction component being a zeolitic material comprising one or more of copper and iron; and
  (ii) an oxidation catalytic component comprising platinum supported on a porous non-zeolitic oxidic support, wherein the oxidation catalytic component further comprises a first oxidic material supported on the porous non-zeolitic oxidic support supporting platinum, wherein the first oxidic material comprises titania.

2. The catalyst of embodiment 1, wherein the selective catalytic reduction component according to (i) is a 8-membered ring pore zeolitic material, wherein the 8-membered ring pore zeolitic material preferably has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, a mixture of two or more thereof and a mixed type of two or more thereof, more preferably selected from the group consisting of CHA, AEI, a mixture of two thereof and a mixed type of two thereof, more preferably selected from the group consisting of CHA and AEI, more preferably CHA; wherein the 8-membered ring pore zeolitic material more preferably is a zeolite SSZ-13.

3. The catalyst of embodiment 1 or 2, wherein the zeolitic material has a framework structure, wherein from 95 to 100 weight-%, preferably from 98 to 100 weight-%, more preferably from 99 to 100 weight-%, of the framework structure of the zeolitic material consist of Si, Al, O, and optionally H, wherein in the framework structure, the molar ratio of Si to Al, calculated as molar $SiO_2:Al_2O_3$, is preferably in the range of from 2:1 to 50:1, more preferably in the range of from 5:1 to 40:1, more preferably in the range of from 8:1 to 30:1, more preferably in the range of from 9:1 to 24:1, more preferably in the range of from 10:1 to 22:1.

4. The catalyst of any one of embodiments 1 to 3, wherein the zeolitic material comprises copper, wherein the amount of copper in the zeolitic material, calculated as CuO, is in the range of from 0.1 to 10 weight-%, preferably in the range of from 2 to 8 weight-%, more preferably in the range of from 3 to 7 weight-%, more preferably in the range of from 4 to 6.5 weight-%, based on the total weight of the zeolitic material.

5. The catalyst of embodiment 4, wherein the amount of iron comprised in the zeolitic material, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.

6. The catalyst of any one of embodiments 1 to 4, wherein the zeolitic material comprises iron, wherein the amount of iron comprised in the zeolitic material, calculated as $Fe_2O_3$, preferably is in the range of from 0.1 to 10 weight-%, more preferably in the range of from 0.5 to 7 weight-%, more preferably in the range of from 1 to 5.5 weight-%, more preferably in the range of from 2 to 5.5 weight-%, based on the total weight of the zeolitic material.

7. The catalyst of any one of embodiments 1 to 6, wherein the coating comprises the selective catalytic component (i) at a loading in the range of from 1 to 5 $g/in^3$, preferably in the range of from 1.2 to 4 $g/in^3$, more preferably in the range of from 1.5 to 3.5 $g/in^3$; wherein preferably from 60 to 95 weight-%, more preferably from 70 to 92 weight-%, more preferably from 75 to 90 weight-%, of the coating consists of the selective catalytic component (i).

8. The catalyst of any one of embodiments 1 to 7, wherein the coating further comprises an oxidic binder, wherein the oxidic binder preferably comprises one or more of zirconia, alumina, titania, silica, and a mixed oxide comprising two or more of Zr, Al, Ti and Si, wherein the oxidic binder more preferably comprises one or more of zirconia and alumina, more preferably zirconia.

9. The catalyst of embodiment 8, wherein the coating comprises the oxidic binder at an amount in the range of from 1 to 10 weight-%, preferably in the range of from 2 to 8 weight-%, more preferably in the range of from 3 to 6 weight-% based on the weight of the zeolitic material.

10. The catalyst of any one of embodiments 1 to 9, wherein from 65 to 95 weight-%, preferably from 70 to 92 weight-%, more preferably from 75 to 90 weight-%, of the oxidation catalytic component consist of the porous non-zeolitic oxidic support.

11. The catalyst of any one of embodiments 1 to 10, wherein the porous non-zeolitic oxidic support comprises one or more of alumina, silica, zirconia, zirconia-alumina, silica-alumina, and mixture of two or more thereof, more preferably one or more of alumina, zirconia-alumina, silica-alumina, and mixture of two or more thereof, wherein the porous non-zeolitic oxidic support more preferably comprises alumina; wherein more preferably from 95 to 100 weight-%, more preferably from 98 to 100 weight-%, more preferably from 99 to 100 weight-%, more preferably from 99.5 to 100 weight-%, of the porous non-zeolitic oxidic support consist of alumina.

12. The catalyst of any one of embodiments 1 to 11, wherein the coating comprises the porous non-zeolitic oxidic support at a loading in the range from 0.15 to 1.0 g/in$^3$, preferably in the range of from 0.15 to 0.75 g/in$^3$, more preferably in the range of from 0.20 to 0.50 g/in$^3$.

13. The catalyst of any one of embodiments 1 to 12, wherein the coating comprises the selective catalytic reduction component (i) at a loading I1, (I1), and the porous non-zeolitic oxidic support at a loading I3, (I3), wherein the loading ratio of the selective catalytic reduction component (i) relative to the porous non-zeolitic oxidic support, expressed as (I1):(I3), is in the range of from 1:1 to 25:1, preferably in the range of from 2:1 to 20:1, more preferably in the range of from 3:1 to 15:1, more preferably in the range of from 4:1 to 12:1, more preferably in the range of from 5:1 to 10:1.

14. The catalyst of any one of embodiments 1 to 13, wherein, when said catalyst has been aged in a gas atmosphere at a temperature in the range of from 700 to 800° C. for a duration in the range of from 10 to 20 h, the gas atmosphere preferably comprising 5 to 15% steam, the platinum supported on the porous non-zeolitic oxidic support has an average crystallite size in the range of from 5 to 100 nm, preferably in the range of from 10 to 30 nm, more preferably in the range of from 12 to 28 nm, more preferably in the range of from 14 to 25 nm, the average crystallite size being determined according to Reference Example 10.

15. The catalyst of any one of embodiments 1 to 14, wherein the coating comprises platinum, calculated as elemental platinum, at an amount in the range of from 0.2 to 1.5 weight-%, preferably in the range of from 0.5 to 1.0 weight-%, based on the weight of the porous non-zeolitic oxidic support;
wherein the coating preferably has a platinum loading in the catalyst, calculated as elemental platinum, in the range of from 0.5 to 25 g/ft$^3$, preferably in the range of from 0.75 to 15 g/ft$^3$, more preferably in the range of from 1 to 8 g/ft$^3$, more preferably in the range of from 1.5 to 5 g/ft$^3$.

16. The catalyst of any one of embodiments 1 to 15, wherein the oxidation catalytic component further comprises one or more platinum group metals other than platinum, preferably one or more of palladium and rhodium, more preferably rhodium;
wherein the coating preferably comprises the one or more platinum group metals other than platinum at a loading in the catalyst, calculated as elemental platinum group metal, in the range of from 0.5 to 20 g/ft$^3$, preferably in the range of from 0.75 to 12 g/ft$^3$, more preferably in the range of from 1 to 6 g/ft$^3$, more preferably in the range of from 1.5 to 4 g/ft$^3$.

17. The catalyst of embodiment 15 or 16, wherein the coating has a total platinum group metal loading in the catalyst, calculated as elemental platinum group metal, in the range of from 1 to 45 g/ft$^3$, preferably in the range of from 1.5 to 27 g/ft$^3$, more preferably in the range of from 2 to 14 g/ft$^3$, more preferably in the range of from 3 to 9 g/ft$^3$.

18. The catalyst of any one of embodiments 15 to 17, wherein the coating has a platinum loading I(a), calculated as elemental platinum, and a one or more platinum group metals other than platinum loading I(b), calculated as elemental platinum group metal, wherein the loading ratio of platinum relative to one or more platinum group metals other than platinum, expressed as I(a):I(b), is in the range of from 1:10 to 10:1, preferably in the range of from 1:5 to 8:1, more preferably in the range of from 1:2 to 7:1, more preferably in the range of from 1:1 to 6:1, more preferably in the range of from 1.1:1 to 5:1, more preferably in the range of from 1.2:1 to 3:1.

19. The catalyst of any one of embodiments 1 to 18, wherein from 95 to 100 weight-%, preferably from 98 to 100 weight-%, more preferably from 99 to 100 weight-%, more preferably from 99.5 to 100 weight-%, of the first oxidic material consist of titania.

20. The catalyst of any one of embodiments 1 to 19, wherein the coating comprises the first oxidic material at an amount in the range of from 1 to 20 weight-%, preferably in the range of from 2 to 10 weight-%, more preferably in the range of from 2.5 to 7.5 weight-%, more preferably in the range of from 3 to 6 weight-%, based on the weight of the porous non-zeolitic oxidic support.

21. The catalyst of any one of embodiments 1 to 20, wherein from 95 to 100 weight-%, preferably from 98 to 100 weight-%, more preferably from 99 to 100 weight-%, more preferably from 99.5 to 100 weight-%, of the coating consist of the oxidation catalytic component (ii), which comprises platinum, the porous non-zeolitic oxidic support, and the first oxidic material comprising titania, wherein the oxidation catalytic component preferably further comprises one or more platinum group metals other than platinum, the selective catalytic reduction component (i), and preferably an oxidic binder as defined in embodiment 8 or 9.

22. The catalyst of any one of embodiments 1 to 20, wherein the oxidation catalytic component further comprises a second oxidic material supported on the porous non-zeolitic oxidic support, the second oxidic material comprising one or more of manganese, cerium, tungsten, molybdenum, praseodymium, europium, chromium, cobalt, technetium, rhenium, ruthenium, vanadium and indium, preferably comprising one or more of manganese, cerium, tungsten, praseodymium and indium, more preferably one or more of manganese, cerium and praseodymium, more preferably one or more of manganese and cerium, wherein the second oxidic material more preferably comprises manganese, more preferably manganese oxide, more preferably one or more of MnO, $Mn_2O_3$, $Mn_3O_4$ and $MnO_2$.

23. The catalyst of embodiment 22, wherein from 95 to 100 weight-%, preferably from 98 to 100 weight-%, more preferably from 99 to 100 weight-%, more preferably 99.5 to 100 weight-%, of the second oxidic material consist of manganese and oxygen.

24. The catalyst of embodiment 22 or 23, wherein the coating comprises the second oxidic material at an amount in the range of from 1 to 20 weight-%, preferably in the range of from 2 to 10 weight-%, based on the weight of the porous non-zeolitic oxidic support.

25. The catalyst of any one of embodiments 22 to 24, wherein from 95 to 100 weight-%, preferably from 98 to 100 weight-%, more preferably from 99 to 100 weight-%, more preferably from 99.5 to 100 weight-%, of the coating consist of the oxidation catalytic component (ii), which comprises platinum, the porous non-zeolitic oxidic support, the first oxidic material comprising titania, and the second oxidic material, wherein the oxidation catalytic component preferably further comprises one or more platinum group metals other than platinum, the selective catalytic reduction component (i), and preferably an oxidic binder as defined in embodiment 8 or 9.

26. The catalyst of any one of embodiments 1 to 25, wherein the substrate is a flow-through substrate or a wall flow filter substrate, preferably a flow-through substrate;
    wherein the substrate preferably comprises, more preferably consists of, one or more of a cordierite, an aluminum titanate, a mullite and a silicon carbide, more preferably one or more of a cordierite, an aluminum titanate and a silicon carbide, more preferably a cordierite, wherein the substrate more preferably is a cordierite flow-through substrate; or wherein the substrate preferably comprises, more preferably consist of, a metallic substance, wherein the metallic substance preferably comprises, more preferably consists of, oxygen and one or more of iron, chromium and aluminum, wherein the substrate more preferably is a metallic flow-through substrate.

27. The catalyst of any one of embodiments 1 to 26, wherein the substrate has an inlet end, an outlet end, a substrate axial length extending from the inlet end to the outlet end and a plurality of passages defined by internal walls of the substrate extending therethrough, wherein the interface between the passages and the internal walls is defined by the surface of the internal walls.

28. The catalyst of embodiment 27, wherein the coating is disposed on the surface of the internal walls of the substrate and extends over 95 to 100%, preferably over 98 to 100%, more preferably over 99 to 100%, of the substrate axial length, wherein the coating preferably extends from the inlet end to the outlet end of the substrate.

29. The catalyst of any one of embodiments 1 to 28, comprising the coating at a loading in the range of from 1 to 6 $g/in^3$, preferably in the range of from 1.5 to 4.5 $g/in^3$, more preferably in the range of from 1.75 to 3.75 $g/in^3$.

30. The catalyst of any one of embodiments 1 to 29, wherein the catalyst consists of the substrate and the coating.

31. The catalyst of any one of embodiments 1 to 30, wherein from 0 to 0.1 weight-%, preferably from 0 to 0.01 weight-%, more preferably from 0 to 0.001 weight-%, of the coating consist of cerium.

32. A process for preparing the ammonia oxidation catalyst according to any one of embodiments 1 to 31, the process comprising
    (a) preparing a first mixture comprising water and the selective catalytic reduction component being the zeolitic material comprising one or more of copper and iron, and preferably a precursor of an oxidic binder, more preferably the oxidic binder as defined in embodiment 8 or 9;
    (b) preparing a second mixture comprising water and a source of the oxidation catalytic component comprising a source of platinum, the porous non-zeolitic oxidic support and the first oxidic material comprising titania;
    (c) mixing the first mixture obtained in (a) and the second mixture obtained in (b);
    (d) disposing the mixture obtained in (c) on a substrate; and optionally drying the substrate comprising the mixture disposed thereon;
    (e) calcining the substrate obtained in (d).

33. The process of embodiment 32, wherein (a) further comprises
    (a.1) preparing a mixture comprising water and a precursor of an oxidic binder, wherein the precursor is preferably one or more of an aluminum salt, a silicon salt, a zirconium salt, and a titanium salt, more preferably one or more of a zirconium salt, and an aluminum salt, more preferably a zirconium salt, more preferably zirconium acetate;
    (a.2) adding the selective catalytic reduction component being the zeolitic material comprising one or more of copper and iron, preferably being a 8-membered ring pore zeolitic material comprising copper, to the mixture obtained in (a.1).

34. The process of embodiment 32 or 33, wherein (b) further comprises
    (b.1) impregnating the source of platinum onto the porous non-zeolitic oxidic support with an adjuvant, the adjuvant preferably being one or more of water and an alcohol, more preferably water;
    (b.2) preferably impregnating a source of one or more platinum group metals other than platinum onto the impregnated porous non-zeolitic oxidic support obtained in (b.1);
    (b.3) impregnating a solution comprising a source of the first oxidic material comprising titania, preferably impregnating a titania hydrogel, onto the impregnated porous non-zeolitic oxidic support obtained in (b.1), preferably obtained in (b.2), obtaining a mixture;
    (b.4) optionally adding a source of a second oxidic material to the mixture obtained in (b.3);
    (b.5) drying and/or calcining the mixture obtained in (b.3), optionally the mixture obtained in (b.4), obtaining a powder;
    (b.6) preparing a mixture comprising water and the powder obtained in (b.5);
    (b.7) preferably milling the particles of the mixture obtained in (b.6), more preferably until the particles of the mixture have a Dv90 in the range of from 3 to 30 micrometers, more preferably in the range of from 5 to 20 micrometers, more preferably in the range of from 8 to 18 micrometers, the Dv90 being determined as described in Reference Example 1;
    wherein (b) preferably consists of (b.1), (b.2), (b.3), (b.5), (b.6) and more preferably (b.7), or (b) preferably consists of (b.1), (b.2), (b.3), (b.4), (b.5), (b.6) and more preferably (b.7).

35. The process of embodiment 34, wherein impregnating according to (b.3) is performed by adding under stirring the solution comprising a source of the first oxidic material to the impregnated porous non-zeolitic oxidic support obtained in (b.1), preferably in (b.2).

36. The process of embodiment 34 or 35, wherein (b.4) is performed by adding under stirring the source of a second oxidic material to the mixture obtained in (b.3).
37. The process of any one of embodiments 34 to 36, wherein the source of a second oxidic material provided in (b.4) is a source comprising one or more of manganese, cerium, tungsten, molybdenum, praseodymium, europium, chromium, cobalt, technetium, rhenium, ruthenium, vanadium and indium, preferably comprising one or more of manganese, cerium, tungsten, praseodymium and indium, more preferably one or more of manganese, cerium and praseodymium, more preferably one or more of manganese and cerium, more preferably a source comprising manganese.
38. The process of embodiment 37, wherein the source of a second oxidic material provided in (b.4) is a salt, preferably a nitrate, more preferably a manganese nitrate.
39. The process of embodiment 32 or 33, wherein (b) further comprises
    (b.1') impregnating the source of platinum onto the porous non-zeolitic oxidic support with an adjuvant, the adjuvant preferably being one or more of water and an alcohol, more preferably water;
    (b.2') impregnating a solution comprising a source of the first oxidic material comprising titania, preferably a titania hydrogel, onto the impregnated porous non-zeolitic oxidic support obtained in (b.1), obtaining a mixture;
    (b.3') impregnating a source of one or more platinum group metals other than platinum onto the impregnated porous non-zeolitic oxidic support obtained in (b.2');
    (b.4') drying and/or calcining the mixture obtained in (b.3'), obtaining a powder;
    (b.5') preparing a mixture comprising water and the powder obtained in (b.4');
    (b.6') preferably milling the particles of the mixture obtained in (b.5'), more preferably until the particles of the mixture have a Dv90 in the range of from 3 to 30 micrometers, more preferably in the range of from 5 to 20 micrometers, more preferably in the range of from 8 to 18 micrometers, the Dv90 being determined as described in Reference Example 1;
    wherein (b) preferably consists of (b.1'), (b.2'), (b.3'), (b.4'), (b.5') and more preferably (b.6').
40. The process of embodiment 39, wherein impregnating according to (b.2') is performed by adding under stirring the solution comprising a source of the first oxidic material to the impregnated porous non-zeolitic oxidic support obtained in (b.1').
41. The process of any one of embodiments 34 to 40, wherein the source of one or more platinum group metals other than platinum provided in (b.2), or (b.3'), is one or more of a source of rhodium and a source of palladium, preferably one or more of a rhodium nitrate solution and a palladium nitrate solution, more preferably a rhodium nitrate solution.
42. The process of any one of embodiments 34 to 41, wherein drying according to (b.5), or (b.4'), is performed in a gas atmosphere having a temperature in the range of from 90 to 160° C., preferably in the range of from 110 to 130° C., the gas atmosphere preferably comprising oxygen.
43. The process of any one of embodiments 34 to 42, wherein calcining according to (b.5), or (b.4'), is performed in a gas atmosphere having a temperature in the range of from 300 to 800° C., preferably in the range of from 400 to 700° C., the gas atmosphere preferably comprising oxygen.
44. The process of any one of embodiments 32 to 43, wherein the porous non-zeolitic oxidic support provided in (b) comprises pores having an average pore size in the range of from 8 to 45 nm, preferably in the range of from 10 to 40 nm, more preferably in the range of from 12 to 30 nm, more preferably in the range of from 15 to 25 nm, the average pore size being determined according to Reference Example 2.
45. The process of any one of embodiments 32 to 44, wherein the porous non-zeolitic oxidic support provided in (b) has an average pore volume in the range of from 0.6 ml/cm$^3$ to 2 ml/cm$^3$, preferably in the range of from 0.65 ml/cm$^3$ to 1.75 ml/cm$^3$, more preferably in the range of from 0.70 ml/cm$^3$ to 1.5 ml/cm$^3$, the average pore volume being determined according to Reference Example 2.
46. The process of any one of embodiments 32 to 45, wherein the porous non-zeolitic oxidic support provided in (b) has a BET specific surface area in the range of from 40 to 300 m$^2$/g, preferably in the range of from 50 to 200 m$^2$/g, more preferably in the range of from 70 to 160 m$^2$/g, the BET specific surface area being determined according to Reference Example 3.
47. The process of any one of embodiments 32 to 46, wherein from 95 to 100 weight-%, preferably from 98 to 100 weight-%, more preferably from 99 to 100 weight-%, more preferably from 99.5 to 100 weight-%, of the porous non-zeolitic oxidic support consist of alumina.
48. The process of any one of embodiments 32 to 47, wherein disposing the mixture obtained in (c) according to (d) is performed by spraying the mixture onto the substrate or by immersing the substrate into the mixture, preferably by immersing the substrate into the mixture.
49. The process of any one of embodiments 32 to 48, wherein the substrate provided in (d) has an inlet end, an outlet end, a substrate axial length extending from the inlet end to the outlet end and a plurality of passages defined by internal walls of the substrate extending therethrough, wherein the interface between the passages and the internal walls defines the surface of the internal walls.
50. The process of embodiment 49, wherein the mixture obtained in (c) is disposed according to (d) over 95 to 100%, preferably from 98 to 100%, more preferably from 99 to 100%, of the substrate axial length, preferably from the inlet end to the outlet end.
51. The process of any one of embodiments 32 to 50, wherein the substrate provided in (d) is a flow-through substrate or a wall flow filter substrate, preferably a flow-through substrate; wherein the substrate provided in (d) preferably is a ceramic substrate, wherein the substrate more preferably comprises, more preferably consists of, one or more of a cordierite, an aluminum titanate, a mullite and a silicon carbide, more preferably one or more of a cordierite, an aluminum titanate and a silicon carbide, more preferably a cordierite, wherein the substrate more preferably is a cordierite flow-through substrate; or
    wherein the substrate provided in (d) preferably comprises, more preferably consist of, a metallic substance, wherein the metallic substance preferably comprises, more preferably consists of, oxygen and one or more of iron, chromium and aluminum, wherein the substrate more preferably is a metallic flow-through substrate.

52. The process of any one of embodiments 32 to 51, wherein drying according to (d) is performed in a gas atmosphere having a temperature in the range of from 90 to 180° C., preferably in the range of from 110 to 130° C., the gas atmosphere preferably comprising oxygen.

53. The process of any one of embodiments 32 to 52, wherein drying according to (d) is performed in a gas atmosphere for a duration in the range of from 10 to 300 minutes, preferably in the range of from 60 to 120 minutes, the gas atmosphere preferably comprising oxygen.

54. The process of any one of embodiments 32 to 53, wherein calcining according to (e) is performed in a gas atmosphere having a temperature in the range of from 300 to 800° C., preferably in the range of from 450 to 650° C., the gas atmosphere preferably comprising oxygen.

55. The process of any one of embodiments 32 to 54, wherein calcining according to (e) is performed in a gas atmosphere for a duration in the range of from 10 to 300 minutes, preferably in the range of from 60 to 120 minutes, the gas atmosphere preferably comprising oxygen.

56. The process of any one of embodiments 32 to 55, further comprising
    (f) ageing the product obtained in (e) in a gas atmosphere, more preferably having a temperature in the range of from 600 to 900° C., more preferably in the range of from 700 to 800° C., the gas atmosphere more preferably comprising oxygen.

57. The process of any of embodiments 32 to 56, consisting of (a), (b), (c), (d) and (e) or consisting of (a), (b), (c), (d), (e) and (f).

58. An ammonia oxidation catalyst obtained or obtainable by a process according to any one of embodiments 32 to 57, preferably 57.

59. Use of an ammonia oxidation catalyst according to any one of embodiments 1 to 31 and 58 for the oxidation of ammonia, wherein ammonia is preferably comprised in an exhaust gas stream from a diesel engine.

60. A method for oxidizing ammonia, wherein ammonia is comprised in an exhaust gas stream, the method comprising
    (1) providing the exhaust gas stream, preferably from a diesel engine;
    (2) passing the exhaust gas stream provided in (1) through a catalyst according to any one of embodiments 1 to 31 and 58.

61. An aged catalyst, obtainable or obtained by a method comprising, preferably consisting of, subjecting the catalyst according to any one of embodiments 1 to 31 and 58 to an ageing treatment comprising, preferably consisting of
    (i) heating the catalyst in a gas atmosphere at a temperature in the range of from 700 to 800° C. for a duration in the range of from 10 to 20 h, the gas atmosphere preferably comprising 5 to 15% steam; wherein said aged catalyst comprises the platinum supported on the porous non-zeolitic oxidic support which exhibits an average crystallite size in the range of from 5 to 100 nm, preferably in the range of from 10 to 30 nm, more preferably in the range of from 12 to 28 nm, more preferably in the range of from 14 to 25 nm, the average crystallite size being determined according to Reference Example 10.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "consists of" with regard to the weight-% of one or more components indicates the weight-% amount of said component(s) based on 100 weight-% of the entity in question. For example, the wording "wherein from 0 to 0.01 weight-% of the coating consists of cerium" indicates that among the 100 weight-% of the components of which said coating consists of, 0 to 0.01 weight-% is cerium.

The present invention is further illustrated by the following Examples, Reference Examples and Comparative Examples.

EXAMPLES

Reference Example 1: Determination of the Volume Pore Size Distributions (Dv90)

The particle size distributions were determined by a static light scattering method using Sympatec HELOS (3200) & QUIXEL equipment, wherein the optical concentration of the sample was in the range of from 6 to 10%.

Reference Example 2: Determination of the Average Pore Volume and the Average Pore Size of a Porous Oxidic Support This was determined by the Barrett-Joyner-Halenda (BJH) Analysis. A pore size distribution determination method, typically applied to nitrogen desorption data measured at 77 K on mesoporous materials. It uses the modified Kelvin equation to relate the amount of adsorbate removed from the pores of the material, as the relative pressure ($P/P_0$) is decreased from a high to low value, to the size of the pores.

Reference Example 3: Measurement of the BET Specific Surface Area

The BET specific surface area was determined according to DIN 66131 or DIN-ISO 9277 using liquid nitrogen.

Reference Example 4: General Coating Method

In order to coat a flow-through substrate with one or more coatings, the flow-through substrate was immersed vertically in a portion of a given slurry for a specific length of the substrate. In this manner, the washcoat contacted the walls of the substrate. The sample was left in the slurry for a specific period of time, usually for 1-10 seconds. Vacuum was applied to draw the slurry into the substrate. The substrate was then removed from the slurry, and was inverted and excess slurry was removed from the substrate by allowing it to drain from the substrate, then by blowing with compressed air (against the direction of slurry penetration).

Reference Example 5: Preparation of an Oxidation Catalyst

Pt/Rh-Alumina Suspension

In a container, 10 g of a solution of platinum amine salt (with 17 weight-% of Pt) was mixed with 100 ml of deionized water. This mixture was added dropwise onto 716 g of an alumina powder ($Al_2O_3$ doped with 20 weight-% of Zr, calculated as $ZrO_2$, a BET specific surface area of 200 $m^2/g$, a pore volume 0.4 $ml/cm^3$, an average pore size of 5 nanometers). Subsequently, 33 ml of a solution of rhodium-nitrate (with 10 weight-% of Rh based on the weight of the solution) was added dropwise onto the obtained platinum-alumina mixture. The resulting mixture was then calcined in a box oven for 2 h at 600° C. in air. The calcined powder was added into 4.5 kg of deionized water, obtaining a suspension. Afterwards, the suspension was milled with a ball mill so that the particles of the suspension had a Dv90 of 15 micrometers. An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.25 $g/in^3$, including, 0.25 $g/in^3$ of alumina-Zr, 3 $g/ft^3$ of Pt and 2 $g/ft^3$ of Rh (a Pt:Rh atomic ratio of 1.5:1).

Reference Example 6: Preparation of an Oxidation Catalyst

Pt/Rh-Alumina Suspension

In a container, 10 g of a solution of platinum amine salt (with 17 weight-% of Pt) was mixed with 100 ml of deionized water. This mixture was added dropwise onto 716 g of an alumina powder (having a BET specific surface area of 100 $m^2/g$, an average pore volume of about 1 $ml/cm^3$, an average pore size of 20 nanometers). Subsequently, 33 ml of a solution of rhodium-nitrate (with 10 weight-% of Rh) was added dropwise onto the obtained platinum-alumina mixture. The resulting mixture was then calcined in a box oven for 2 h at 600° C. in air. The calcined powder was added into deionized water, obtaining a suspension. Afterwards, the suspension was milled with a ball mill so that the particles of the suspension had a Dv90 of 15 micrometers. An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.25 $g/in^3$, including 0.25 $g/in^3$ of alumina, 3 $g/ft^3$ of Pt and 2 $g/ft^3$ of Rh (a Pt:Rh atomic ratio of 1.5:1).

Reference Example 7 Preparation of an Oxidation Catalyst

Pt/Rh-Alumina Suspension

In a container, 10 g of a solution of platinum amine salt (with 17 weight-% of Pt) was mixed with 100 ml of deionized water. This mixture was added dropwise onto 716 g of an alumina powder (having a BET specific surface area of 100 $m^2/g$, an average pore volume of about 1 $ml/cm^3$, an average pore size of 20 nanometers). Subsequently 33 ml of a solution of rhodium-nitrate (with 10 weight-% of Rh) was added dropwise onto the Pt-alumina mixture. Subsequently, 200 g of a $TiO_2$ hydrogel (with 18 weight-% of $TiO_2$ based on the weight of the hydrogel) was added dropwise under vigorous mixing with an eirich mixer to the Pt/Rh-alumina mixture. Afterwards, 60 g of a manganese nitrate solution (with a Mn content of 50 weight-%, calculated as MnO, based on the weight of the solution) was added dropwise under vigorous mixing. The resulting mixture was dried for 2 h at 120° C. and then calcined in a box oven for 2 h at 600° C. in air, obtaining a powder. The calcined powder was added into 4.5 kg of deionized water. Afterwards, the obtained suspension was milled with a ball mill so that the particles of the suspension had a Dv90 of 15 micrometers. An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.27 $g/in^3$, including 0.25 $g/in^3$ of alumina, 0.0125 $g/in^3$ of titania, 0.01 $g/in^3$ of MnO, 3 $g/ft^3$ of Pt and 2 $g/ft^3$ of Rh (a Pt:Rh atomic ratio of 1.5:1).

Reference Example 8 Preparation of an Oxidation Catalyst

Pt/Rh-Alumina Suspension

In another container, 10 g of a solution of platinum amine salt (with 17 weight-% of Pt) was mixed with 100 ml of deionized water. This mixture was added dropwise onto 716 g of an alumina powder (having a BET specific surface area of 100 $m^2/g$, an average pore volume of about 1 ml/g, an average pore size of 20 nanometers). Subsequently, 200 g of a $TiO_2$ hydrogel (with 18 weight-% of $TiO_2$ based on the weight of the hydrogel) was added dropwise under vigorous mixing to the Pt-alumina mixture. Afterwards, 33 ml of a solution of rhodium-nitrate (with 10 weight-% of Rh based on the weight of the solution) was added dropwise to the obtained mixture. Said mixture was dried for 2 hours at 120° C. and then calcined in a box oven for 2 hours at 600° C. in air, obtaining a powder. The calcined powder was added into 4.5 kg of deionized water. Afterwards, the obtained suspension was milled with a ball mill so that the particles of the suspension had a Dv90 of 15 micrometers. An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.26 g/in$^3$, including 0.25 g/in$^3$ of alumina, 0.0125 g/in$^3$ of titania, 3 g/ft$^3$ of Pt and 2 g/ft$^3$ of Rh (a Pt:Rh atomic ratio of 1.5:1).

Reference Example 9 Preparation of an Oxidation Catalyst

Pt/Rh-Alumina Suspension

In another container, 10 g of a solution of platinum amine salt (with 17 weight-% of Pt) was mixed with 100 ml of deionized water. This mixture was added dropwise onto 716 g of an alumina powder (having a BET specific surface area of 100 m$^2$/g, an average pore volume of about 1 ml/cm$^3$, an average pore size of 20 nanometers). Subsequently 33 ml of a solution of rhodium-nitrate (with 10 weight-% of Rh based on the weight of the solution) was added dropwise onto the Pt-alumina mixture. Subsequently, 200 g of a TiO$_2$ hydrogel (with 18 weight-% of TiO$_2$ based on the weight of the hydrogel) was added dropwise under vigorous mixing to the Pt/Rh-alumina mixture. The resulting mixture was dried for 2 h at 120° C. and then calcined in a box oven for 2 h at 600° C. in air. The calcined powder was added into 4.5 kg of deionized water. Afterwards, the obtained suspension was milled with a ball mill so that the particles of the suspension had a Dv90 of 15 micrometers. An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.26 g/in$^3$, including 0.25 g/in$^3$ of alumina, 0.0125 g/in$^3$ of titania, 3 g/ft$^3$ of Pt and 2 g/ft$^3$ of Rh (a Pt:Rh atomic ratio of 1.5:1).

Comparative Example 1: Preparation of an AMOX Catalyst not according to the Present Invention a) Zeolite Suspension 0.7 kg of a solution of zirconium acetate was mixed with 5.2 kg of deionized water in a container. To this mixture, 5.0 kg of a Cu-SSZ-13 zeolitic material (with a Cu content of 3.3 weight-%, calculated as CuO, based on the weight of the zeolitic material, a SiO$_2$:Al$_2$O$_3$ molar ratio of 25, a BET specific surface area of about 500-600 m$^2$/g, and a Dv90 of 5 micrometers) was added.

b) Pt/Rh-Alumina Suspension

Said suspension was prepared as the Pt/Rh-alumina suspension prepared in Ref. Example 5.

c) Final Suspension

Further, the Pt/Rh-alumina suspension obtained in b) was added to the zeolite suspension obtained in a) and mixed thoroughly.

An uncoated honeycomb flow-through ceramic monolith substrate (cordierite—diameter: 2.54 cm (1 inch) x length: 10.16 cm (4 inches) cylindrically shaped substrate with $400/(2.54)^2$ cells per square centimeter and 0.1 millimeter (4 mil) wall thickness) was dip coated with the final suspension over 100% of the length of the substrate according to the method described in Reference Example 4. The coated substrate was dried at 120° C. for 2 hours and calcined in air for 2 hours at 590° C. The final loading of the coating in the catalyst after calcination was about 2 g/in$^3$, including 1.65 g/in$^3$ of Cu-SSZ-13, 0.25 g/in$^3$ of alumina-Zr, 0.1 g/in$^3$ of zirconia, 3 g/ft$^3$ of Pt and 2 g/ft$^3$ of Rh (a Pt:Rh atomic ratio of 1.5:1).

Comparative Example 2: Preparation of an AMOX Catalyst not According to the Present Invention The catalyst of Comparative Example 2 was prepared as the catalyst of Comparative Example 1 except that a Cu-SSZ-13 zeolitic material (with a Cu content of 4.5 weight-%, calculated as CuO, based on the weight of the zeolitic material, a SiO$_2$:Al$_2$O$_3$ molar ratio of 25, a BET specific surface area of about 500-600 m$^2$/g, and a Dv90 of 5 micrometers) was used.

Comparative Example 3: Preparation of an AMOX Catalyst not According to the Present Invention The catalyst of Comparative Example 3 was prepared as the catalyst of Comparative Example 1 except that a Cu-SSZ-13 zeolitic material (with a Cu content of 5.5 weight-%, calculated as CuO, based on the weight of the zeolitic material, a SiO$_2$:Al$_2$O$_3$ molar ratio of 18, a BET specific surface area of about 500-600 m$^2$/g, and a Dv90 of 5 micrometers) was used.

Comparative Example 4: Preparation of an AMOX Catalyst not According to the Present Invention a) Zeolite Suspension 0.7 kg of a solution of zirconium acetate was mixed with 5.2 kg of deionized water in a container. To this mixture, 5.0 kg of a Cu-SSZ-13 zeolitic material (with a Cu content of 5.5 weight-%, calculated as CuO, based on the weight of the zeolitic material, a SiO$_2$:Al$_2$O$_3$ molar ratio of 18, a BET specific surface area of about 500-600 m$^2$/g, and a Dv90 of 5 micrometers) was added.

b) Pt/Rh-Alumina Suspension

Said suspension was prepared as the Pt/Rh-alumina suspension prepared in Ref. Example 6.

c) Final Suspension

Further, the Pt/Rh-alumina suspension obtained in b) was added to the zeolite suspension obtained in a) and mixed thoroughly.

An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the final suspension over 100% of the length of the substrate according to the method described in Reference Example 4. The coated substrate was dried at 120° C. for 2 hours and calcined in air for 2 hours at 600° C. The final loading of the coating in the catalyst after calcination was about 2 g/in$^3$, including 1.65 g/in$^3$ of Cu-SSZ-13, 0.25 g/in$^3$ of alumina, 0.1 g/in$^3$ of zirconia, 3 g/ft$^3$ of Pt and 2 g/ft$^3$ of Rh (a Pt:Rh atomic ratio of 1.5:1).

Example 1: Preparation of an AMOX Catalyst a) Zeolite Suspension 0.7 kg of a solution of zirconium acetate was mixed with 5.2 kg of deionized water in a container. To this mixture, 5.0 kg of a Cu-SSZ-13 zeolitic material (with a Cu content of 5.5 weight-%, calculated as CuO, based on the weight of the zeolitic material, a $SiO_2:Al_2O_3$ molar ratio of 18, a BET specific surface area of about 500-600 $m^2/g$, and a Dv90 of 5 micrometers) was added.

b) Pt/Rh-Alumina Suspension

Said suspension was prepared as the Pt/Rh-alumina suspension prepared in Ref. Example 7.

c) Final Suspension

Further, the Pt/Rh-alumina suspension obtained in b) was added to the zeolite suspension obtained in a) and mixed thoroughly.

An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the final suspension over 100% of the length of the substrate according to the method described in Reference Example 4. The coated substrate was dried at 120° C. for 2 hours and calcined in air for 2 hours at 600° C. The final loading of the coating in the catalyst after calcination was about 2 $g/in^3$, including 1.65 $g/in^3$ of Cu-SSZ-13, 0.25 $g/in^3$ of alumina, 0.0125 $g/in^3$ of titania, 0.01 $g/in^3$ of MnO, 0.1 $g/in^3$ of zirconia, 3 $g/ft^3$ of Pt and 2 $g/ft^3$ of Rh (a Pt:Rh atomic ratio of 1.5:1).

Example 2: Preparation of an AMOX Catalyst a) Zeolite Suspension

Said suspension was prepared as the zeolitic suspension prepared in a) of Example 1.

b) Pt/Rh-Alumina Suspension

Said suspension was prepared as the Pt/Rh-alumina suspension prepared in Ref. Example 8.

c) Final Suspension

Further, the Pt/Rh/alumina suspension was added to the zeolite suspension and mixed thoroughly.

An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the final suspension over 100% of the length of the substrate according to the method described in Reference Example 4. The coated substrate was dried at 120° C. for 2 hours and calcined in air for 2 hours at 600° C. The final loading of the coating in the catalyst after calcination was about 2 $g/in^3$, including 1.65 $g/in^3$ of Cu-SSZ-13, 0.25 $g/in^3$ of alumina, 0.0125 $g/in^3$ of titania, 0.1 $g/in^3$ of zirconia, 3 $g/ft^3$ of Pt and 2 $g/ft^3$ of Rh (a Pt:Rh atomic ratio of 1.5:1).

Example 3: Preparation of an AMOX Catalyst a) Zeolite Suspension

Said suspension was prepared as the zeolitic suspension prepared in a) of Example 1.

b) Pt/Rh-Alumina Suspension

Said suspension was prepared as the Pt/Rh-alumina suspension prepared in Ref. Example 9.

c) Final Suspension

Further, the Pt/Rh-alumina suspension obtained in b) was added to the zeolite suspension obtained in a) and mixed thoroughly.

An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the final suspension over 100% of the length of the substrate according to the method described in Reference Example 4. The coated substrate was dried at 120° C. for 2 hours and calcined in air for 2 hours at 600° C. The final loading of the coating in the catalyst after calcination was about 2 $g/in^3$, including 1.65 $g/in^3$ of Cu-SSZ-13, 0.25 $g/in^3$ of alumina, 0.0125 $g/in^3$ of titania, 0.1 $g/in^3$ of zirconia, 3 $g/ft^3$ of Pt and 2 $g/ft^3$ of Rh (a Pt:Rh atomic ratio of 1.5:1).

Reference Example 10: Measurement of the Average Platinum Group Metal (PGM) Crystallite Size The measurement of the average platinum group metal (PGM) crystallite size was performed according to the method disclosed in the application WO 2015/143191 A1, see in particular [0064]-[0075] of said application.

Example 4: Performance Testing

The catalysts of Reference Examples 4 to 8, of Comparative Examples 1 to 4 and of Examples 1 to 3 were tested. The catalysts were aged for 16 h at 750° C. with 10% steam. The test was performed with a laboratory reactor that consists of a heated tube that contains the test sample with a size of 1 inch diameter and four inch length. The feed gas concentration was set to 220 ppm $NH_3$, 5% $CO_2$ and 15% $O_2$ in $N_2$, the space velocity was 90 k $h^{-1}$ and the gas and sample temperature was set to 150° C. Under these conditions the test was run for 10 min (heat up from 150 to 550° C.–SV=80 k $h^{-1}$, 225 ppm $NH_3$, 12% $O_2$, 4% $H_2O$, 4% $CO_2$). After this and 30 minutes at 150° C., additional 150 ppm NO was fed into the gas and the temperature was set to rise by 30° C./min until 550° C. was reached (SV=80 k $h^{-1}$, 225 ppm $NH_3$, 150 ppm NO 12% $O_2$, 4% $H_2O$, 4% $CO_2$). During this test, the inlet and outlet concentrations were measured with an FTIR. The NOx conversion was calculated by:

$$NOx\ con\ (\%) = ((NOx\ out\ (ppm)/(NOx\ in\ (ppm)) - 1) * 100.$$

The results are displayed in Table 1 below and in FIG. 1.

TABLE 1

| | Ammonia light-off temperatures, $N_2O$ and NOx formed | | | | | |
|---|---|---|---|---|---|---|
| | PGM size* (nm) | T50 [$NH_3$] (° C.) - without zeolite | T50 [$NH_3$] (° C.) | Light-off T difference** | $N_2O$ formed (g) | NOx formed (g) |
| C. Ex. 1 (Cu—CHA$^a$) | 20 | 242 (Ref. Ex. 5) | 282 | 40 | 0.46 | 0.59 |
| C. Ex. 2 (Cu—CHA$^b$) | 20 | 242 (Ref. Ex. 5) | 302 | 60 | 0.24 | 0.58 |
| C. Ex. 3 (Cu—CHA$^c$) | 20 | 242 (Ref. Ex. 5) | 301 | 59 | 0.25 | 0.33 |

TABLE 1-continued

Ammonia light-off temperatures, N₂O and NOx formed

| | PGM size* (nm) | T50 [NH₃] (° C.) - without zeolite | T50 [NH₃] (° C.) | Light-off T difference** | N₂O formed (g) | NOx formed (g) |
|---|---|---|---|---|---|---|
| C. Ex. 4 (Cu—CHA$^c$) | 17 | 263 (Ref. Ex. 6) | 307 | 44 | 0.25 | 0.29 |
| Ex. 1 (Cu—CHA$^c$) | 23 | 281 (Ref. Ex. 7) | 301 | 20 | 0.25 | 0.26 |
| Ex. 2 (Cu—CHA$^c$) | 21 | 283 (Ref. Ex. 8) | 320 | 37 | 0.18 | 0.25 |
| Ex. 3 (Cu—CHA$^c$) | 21 | 283 (Ref. Ex. 9) | 310 | 27 | 0.24 | 0.23 |

*PGM average crystallite size determined according to Ref. Example 10.
**T50 [NH₃] (with zeolite) − T50 [NH₃] (without zeolite)
$^a$Cu-SSZ-13: 3.3 weight-% of Cu, calculated as CuO - a SiO$_2$:Al$_2$O$_3$ molar ratio of 25
$^b$Cu-SSZ-13: 4.5 weight-% of Cu, calculated as CuO - a SiO$_2$:Al$_2$O$_3$ molar ratio of 18
$^c$Cu-SSZ-13: 5.5 weight-% of Cu, calculated as CuO - a SiO$_2$:Al$_2$O$_3$ molar ratio of 18

As may be taken from Table 1, the lowest increase of the ammonia light-off temperature is achieved with the catalysts of Examples 1 to 3, which comprise titania supported on the porous alumina. This effect is more pronounced with the catalyst of Example 1 which comprise in addition to titania, MnO. Further, it is observed that lower NOx are formed with the catalysts of Examples 1 to 3, which comprise titania supported on the porous alumina, compared to the catalysts of Comparative Examples 1 to 4, which do not comprise titania or MnO. Finally, it is also believed that the order of the impregnation of Pt, Rh and TiO$_2$ onto the porous support has an impact on the ammonia light-temperature. In particular, the catalyst of Example 2 which was prepared by first impregnating Pt on alumina, then TiO$_2$ and to finish impregnating Rh exhibits a light-off temperature difference of 37° C. compared to the reduced light-off temperature difference which is of 27° C. obtained with the catalyst of Example 3 which was prepared by first impregnating Pt, then Rh and to finish impregnating TiO$_2$. Consequently, the catalysts of Examples 1 to 3 according to the present invention exhibit higher selectivity compared the catalysts of Comparative Examples 1 to 4. The inventive catalysts permit to reduce the formation of NOx as well as those of nitrous oxide.

Finally, from Table 1, without wanting to be bound to any theory it is believed that, when titania is impregnated onto the porous non-zeolitic oxidic support which already supports platinum (and optionally rhodium), titania can reduce the interaction of platinum and copper in the coating of the catalyst of the present invention. Indeed, this is supported by the improved NOx conversion obtained with the catalysts according to the present invention.

Reference Example 11: Preparation of an Oxidation Catalyst

The catalyst of Reference Example 11 was prepared as the catalyst of Reference Example 9 except that the porous alumina powder (having a BET specific surface area of 100 m²/g, an average pore volume of about 1 ml/cm³, an average pore size of 20 nanometers) has been replaced by a porous alumina powder (having a BET specific surface area of 150 m²/g, an average pore volume of 0.9 ml/cm³ and an average pore size of 18 nm—solid content 96%).

Reference Example 12: Preparation of an Oxidation Catalyst

Pt/Rh-Alumina Suspension
101 g of a solution of ZrO with a solid of 30 wt.-% was added dropwise under vigorous stirring to 395 g of a porous gamma alumina powder (having a BET specific surface area of 150 m²/g, an average pore volume of 0.9 ml/cm³ and an average pore size of 18 nm—solid content 96%). Afterwards the powder was calcined for 4 h at 650° C. in an oven under air.

12.8 g of platinum monoethanol solution (with 16 weight-% of Pt) was mixed with 100 mg of deionized water. This mixture was added dropwise under vigorous stirring onto the obtained Zr-doped alumina powder. Subsequently, 15.2 g of a rhodium-nitrate solution (with 9.6 weight-% of Rh) was diluted with 100 g deionized water and added dropwise under stirring onto the obtained platinum/Zr-doped alumina mixture.

The resulting mixture was dried for 2 h at 120° C. and then calcined in a box oven for 2 h at 600° C. in air. The calcined powder was added into deionized water (1 kg), obtaining a suspension. Afterwards, the suspension was milled with a ball mill so that the particles of the suspension had a Dv90 of 10 micrometers.

An uncoated honeycomb flow-through ceramic monolith substrate (cordierite—diameter: 2.54 cm (1 inch)×length: 10.16 cm (4 inches) cylindrically shaped substrate with 400/(2.54)² cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.25 g/in³, including 0.25 g/in³ of Zr-alumina (8 weight-% of Zr, calculated as ZrO$_2$, based on the weight of alumina), 3 g/ft³ of Pt and 2 g/ft³ of Rh (a Pt:Rh atomic ratio of 1.5:1).

Reference Example 13: Preparation of an Oxidation Catalyst

Pt/Rh-Alumina Suspension
162 g of a TiO$_2$ sol gel with a solid content of 18.5 weight-% was added dropwise under vigorous stirring to 395 g of a porous gamma alumina powder (having a BET specific surface area of 150 m²/g, an average pore volume of 0.9 ml/cm³ and an average pore size of 18 nm—solid content 96%). Afterwards, the powder was calcined for 4 h at 650° C. in an oven under air.

12.8 g of platinum monoethanol solution (with 16 weight-% of Pt) was mixed with 100 mg of deionized water. This mixture was added dropwise under vigorous stirring onto the obtained Ti-doped alumina powder. Subsequently, 15.2 g of a rhodium-nitrate solution (with 9.6 weight-% of Rh) was diluted with 100 g deionized water and added dropwise under stirring onto the obtained platinum/Ti-doped alumina mixture.

The resulting mixture was dried for 2 h at 120° C. and then calcined in a box oven for 2 h at 600° C. in air. The calcined powder was added into deionized water (1 kg), obtaining a suspension. Afterwards, the suspension was milled with a ball mill so that the particles of the suspension had a Dv90 of 10 micrometers.

An uncoated honeycomb flow-through ceramic monolith substrate (cordierite—diameter: 2.54 cm (1 inch)×length: 10.16 cm (4 inches) cylindrically shaped substrate with $400/(2.54)^2$ cells per square centimeter and 0.1 millimeter (4 mil) wall thickness) was dip coated with the obtained suspension over 100% of the length of the substrate according to the method described in Reference Example 4. The coated substrate was dried at 120° C. for 2 hours and calcined in air for 2 hours at 600° C. The final loading of the coating in the catalyst after calcination was about 0.25 g/in$^3$, including 0.25 g/in$^3$ of Ti-alumina (8 weight-% of Ti, calculated as TiO$_2$, based on the weight of alumina), 3 g/ft$^3$ of Pt and 2 g/ft$^3$ of Rh (a Pt:Rh atomic ratio of 1.5:1).

Reference Example 14: Performance Testing

The catalysts of Reference Examples 5 and 11 to 13 were tested. The catalysts were aged for 16 h at 750° C. with 10% steam in air and evaluated with a NH$_3$ light off test. For this test, 750 ppm NH$_3$, 12% CO$_2$, 4% O$_2$ and 4% H$_2$O was fed to the reactor inlet at 150° C. with a space velocity (SV) of 100 k h$^{-1}$. After complete saturation of the catalyst with NH$_3$, the temperature was increase with a rate of 5° C./min up to 550° C. The temperature of 50% NH$_3$ conversion was recorded and is plotted in table 2 for the different catalysts as well as the N$_2$O peak emissions.

TABLE 2

Ammonia light off temperature and peak nitrous oxide emissions

|  | T50 [NH$_3$] (° C.) | N$_2$O/ppm |
|---|---|---|
| Reference Ex. 5 | 273 | 38 |
| Reference Ex. 11 | 295 | 16 |
| Reference Ex. 12 | 227 | 70 |
| Reference Ex. 13 | 245 | 45 |

As may be taken from Table 2, the lowest nitrous oxide emission is obtained with the catalyst of Reference Example 11, which comprise titania supported on the porous alumina which already supports Pt and Rh, compared to the catalyst of Reference Examples 5 and 12, which do not comprise titania. Further, the lowest nitrous oxide emission is also obtained with the catalyst of Reference Example 11, which comprise titania supported on the porous alumina which already supports Pt and Rh, compared to the catalyst of Reference Example 13, which comprises Pt and Rh supported on Ti-doped alumina, while maintaining the ammonia light off temperature. Indeed, the emissions of nitrous oxide is reduced by about 64% when using the catalyst of Reference Example 11 while the ammonia light off presents an increase of 20% compared to the catalyst of Reference Example 13. Thus, it is believed that not only the presence of titania in a catalyst has an effect on the performance of a catalyst but also its position on the porous alumina in view of the other components of the catalyst.

BRIEF DESCRIPTION OF THE FIGURE

FIG. 1 shows the ammonia light-off temperature, NOx and N$_2$O formed (in g/l) obtained with the catalysts of Comparative Example 3, Example 1 and Example 2.

CITED LITERATURE

WO 2010/062730 A2
EP 2 878 360 A1
WO 2015/143191 A1

The invention claimed is:

1. An ammonia oxidation catalyst for the treatment of an exhaust gas stream, the catalyst comprising a coating disposed on a substrate, wherein the coating comprises:
   (i) a selective catalytic reduction component of a zeolite material comprising one or more of copper and iron; and
   (ii) an oxidation catalytic component comprising platinum supported on a porous non-zeolite oxide support, wherein the oxidation catalytic component further comprises a first oxide material supported on the porous non-zeolite oxide support supporting platinum, wherein the first oxide material comprises titania, wherein from 65 wt.-% to 95 wt.-%, of the oxidation catalytic component consist of the porous non-zeolite oxide support.

2. The catalyst of claim 1, wherein the selective catalytic reduction component according to (i) is a 8-membered ring pore zeolite material.

3. The catalyst of claim 1, wherein the coating further comprises an oxide binder, wherein the oxide binder comprises an oxide selected from the group consisting of zirconia, alumina, titania, silica, and a combination of any two or more thereof.

4. The catalyst of claim 1, wherein the porous non-zeolite oxide support comprises a non-zeolite selected from the group consisting of alumina, silica, zirconia, zirconia-alumina, silica-alumina, and a combination of any two or more thereof.

5. The catalyst of claim 1, wherein the coating comprises the selective catalytic reduction component (i) at a loading 11, (11), and the porous non-zeolite oxide support at a loading 13, (13), wherein the loading ratio of the selective catalytic reduction component (i) relative to the porous non-zeolite oxide support, expressed as (11):(13), ranges from 1:1 to 25:1.

6. The catalyst of claim 1, wherein the coating comprises platinum, calculated as elemental platinum, at an amount ranging from 0.2 wt.-% to 1.5 wt-%, based on the weight of the porous non-zeolite oxide support.

7. The catalyst of claim 1, wherein the oxidation catalytic component further comprises one or more platinum group metals other than platinum.

8. The catalyst of claim 1, wherein the coating comprises the first oxide material at an amount ranging from 1 wt.-% to 20 wt,-%, based on the weight of the porous non-zeolite oxide support.

9. The catalyst of claim 1, wherein the oxidation catalytic component further comprises a second oxide material supported on the porous non-zeolite oxide support, the second oxide material comprising an element selected from the group consisting of manganese, cerium, tungsten, molybdenum, praseodymium, europium, chromium, cobalt, technetium, rhenium, ruthenium, vanadium, indium and a combination of any two or more thereof.

10. A process for preparing the ammonia oxidation catalyst according to claim 1, the process comprising
   (a) preparing a first mixture comprising water and a selective catalytic reduction component a zeolite material comprising one or more of copper and iron;
   (b) preparing a second mixture comprising water and a source of the oxidation catalytic component comprising a source of platinum, a porous non-zeolite oxide support and a first oxide material comprising titania;
   (c) mixing the first mixture obtained in (a) and the second mixture obtained in (b);
   (d) disposing the mixture obtained in (c) on a substrate; and optionally drying the substrate comprising the mixture disposed thereon; and
   (e) calcining the substrate obtained in (d), wherein from 65 wt % to 95 wt %, of the oxidation catalytic component consist of the porous non-zeolite oxide support.

11. The process of claim 10, wherein (a) further comprises
   (a.1) preparing a mixture comprising water and a precursor of an oxide binder;
   (a.2) adding the selective catalytic reduction component of the zeolite material comprising one or more of copper and iron to the mixture obtained in (a.1).

12. The process of claim 10, wherein (b) further comprises
   (b.1) impregnating the source of platinum onto the porous non-zeolite oxide support with an adjuvant;
   (b.2) optionally, impregnating a source of one or more platinum group metals other than platinum onto the impregnated porous non-zeolite oxide support obtained in (b.1);
   (b.3) impregnating a solution comprising a source of the first oxide material comprising titania onto the impregnated porous non-zeolite oxide support obtained in (b.1), obtaining a mixture;
   (b.4) optionally adding a source of a second oxide material to the mixture obtained in (b.3);
   (b.5) drying, calcining, or both the mixture obtained in (b.3), optionally the mixture obtained in (b.4), obtaining a powder;
   (b.6) preparing a mixture comprising water and the powder obtained in (b.5);
   (b.7) optionally, milling the particles of the mixture obtained in (b.6); or
   wherein (b) further comprises
   (b.1') impregnating the source of platinum onto the porous non-zeolite oxide support with an adjuvant;
   (b.2') impregnating a solution comprising a source of the first oxide material comprising titania onto the impregnated porous non-zeolite oxide support obtained in (b.1), obtaining a mixture;
   (b.3') impregnating a source of one or more platinum group metals other than platinum onto the impregnated porous non-zeolite oxide support obtained in (b.2');
   (b.4') drying and calcining the mixture obtained in (b.3'), obtaining a powder;
   (b.5') preparing a mixture comprising water and the powder obtained in (b.4'); and
   (b.6') optionally, milling the particles of the mixture obtained in (b.5').

13. The process of claim 10, wherein the porous non-zeolite oxide support provided in (b) has an average pore volume ranging from 0.6 ml/cm$^3$ to 2 ml/cm$^3$.

14. A method for oxidizing ammonia, wherein ammonia is comprised in an exhaust gas stream, the method comprising
   (1) providing the exhaust gas stream;
   (2) passing the exhaust gas stream provided in (1) through a catalyst according to claim 1.

* * * * *